E. T. GREENFIELD.
TIRE.
APPLICATION FILED OCT. 30, 1906
902,147.
Patented Oct. 27, 1908.
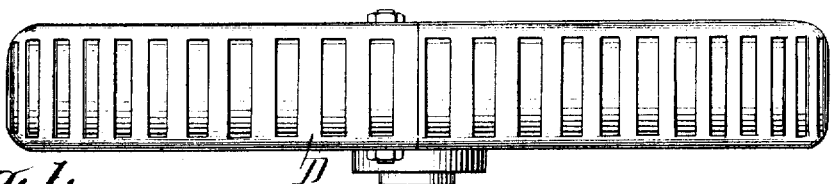
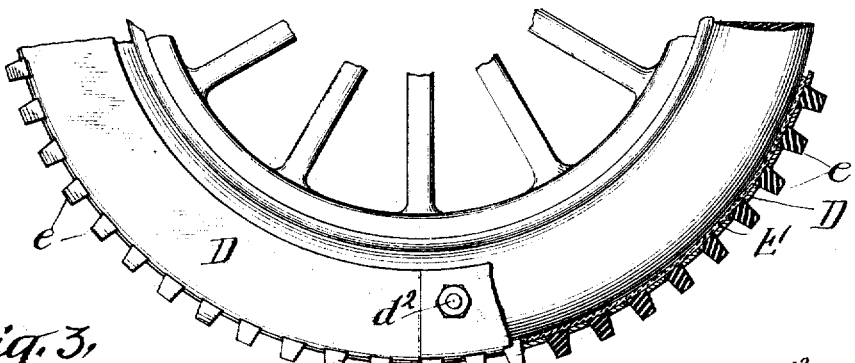
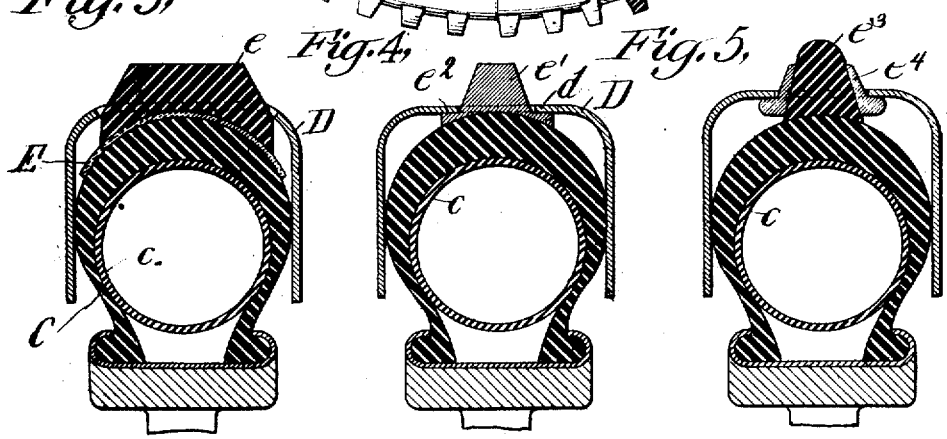
WITNESSES
INVENTOR
Edward T. Greenfield
BY
ATTORNEY

UNITED STATES PATENT OFFICE.

EDWIN T. GREENFIELD, OF KIAMESHA, NEW YORK.

TIRE.

No. 902,147.  Specification of Letters Patent.  Patented Oct. 27, 1908.

Application filed October 30, 1906. Serial No. 341,255.

*To all whom it may concern:*

Be it known that I, EDWIN T. GREENFIELD, a citizen of the United States, residing at Kiamesha, in the county of Sullivan and State of New York, have invented certain new and useful Improvements in Tires, of which the following is a specification.

This invention concerns tires for the wheels of vehicles and adapted specially for use on the wheels of self-propelled cars.

The object of the invention is to improve the construction of tires for this use with respect particularly to the provision of a metallic protective casing or armoring for a pneumatic or other tire, which will protect the rubber of the tire against abrasion or puncture.

A further object of the invention is to combine with such a protective casing portions projecting beyond the surface thereof and serving to prevent slipping or skidding when the roadway is slippery or when the vehicle is rounding a curve.

I have illustrated the preferred embodiment of my invention in the accompanying drawings in which Figure 1 is a plan view of the tire having the anti-skidding means applied thereto, Fig. 2 is an elevation of a portion of the same, Fig. 3 is a transverse section, Figs. 4 and 5 are views similar to that of Fig. 3 illustrating modifications and Fig. 6 is a top view of a portion of a modified form of tire.

Referring to the drawings, the wheel has a rim secured on the felly, this rim having upwardly and inwardly curved flanges at its edges adapted to engage flanges formed on the shoe C inclosing the inner tube c. Any other form of resilient tire desired may be used instead of the inflatable tire shown, such as a solid rubber or an uninflated tube tire. The armoring D for the resilient tube consists of one or more pieces of sheet-metal, preferably steel, bent to a U-shape cross section. The longitudinal bends in the metal strip to form the U are made on curves of shorter radius than the curve of the outer surface of the resilient tube so as to provide spaces between the shoe C and the armor D, into which the shoe may fill when the tire is depressed by an obstacle in the roadway. When the tube c is inflated the periphery of the shoe C is pressed outwardly as far as is permitted by the armoring and the sides extend down on either side of the shoe, as shown in Fig. 3.

The armoring D consists of one or more pieces of metal rigidly secured together at the ends. Preferably it is formed of four such pieces, and though this may be changed as desired, I consider it desirable to employ a small number of pieces. The pieces are curved longitudinally to an arc-shape in addition to being curved transversely to a U-shape section and each of them is of greater length than the area of contact of the armoring with the ground under any conditions. The ends of the pieces are rigidly secured together preferably by lapping one over the other and passing bolts through openings in the overlapping portions. This construction is best illustrated in Fig. 2 in which $d^2$ is a bolt having a thin flat head and a shank passing through openings in the two thicknesses of the plates at the sides of the armoring and a nut is screwed up on the shank into engagement with the plate to secure the plates firmly together. If it is desired to effect this joint between the ends of the plates without breaking the continuity of the curve of the outer surface of the armoring, the underlapping portion of each of the plates may be reduced in size by an amount equal to the thickness of the plates, as shown in Fig. 1. The armoring thus constructed forms ample protection against injury to the rubber of the tire; it can be manufactured at small cost, and the joints between the ends of the plates are of ample strength since with this type of armoring it is unnecessary to provide for a movement of each plate relatively to those adjacent thereto when the tire is depressed at the bottom of the wheel.

To prevent slipping and skidding I provide on the armoring anti-skidding devices projecting beyond the outer surface thereof; this is preferably done by cutting in the outer face $d$ of the armoring a series of openings of any suitable shape and inserting studs in these openings whose ends project beyond the outer surface of the portion $d$.

E indicates a strip of leather or a strong coarse fabric on which are secured a series of studs $e$ preferably of metal and spaced apart by a distance equal to the distance between the several openings of the series shown as cut in the face $d$ of the armoring. This strip with the projections thereon is inserted within the armoring before the latter is applied over the shoe C, the studs $e$ are passed partly through the openings in the face d and the armoring is then applied over the shoe C as above described; when the tube c is inflated it will constantly exert a pressure tending to hold the projections e pressed out through the openings. The studs cannot be pulled through the openings, however, or torn from the tire as they are held securely by the band E.

In Figs. 1, 2, and 3, I have shown the openings in the face d of the armoring and the studs e as of oblong cross-section, but this shape may be varied as for instance, as shown in Figs. 4 and 5.

In Fig. 4 the studs e' are of frusto-conical shape and each has a flange at its base and the openings in the face d of the armoring are round. These studs e' are not secured upon a strip, such as the strip E, but each is forced through its opening in the armoring until the flange e² thereon engages the underside of the face d of the armoring and in this position they are held by the shoe C.

In Fig. 5, the studs are shown as consisting partly of metal and partly of rubber or a suitable composition. The rubber portion e³ is of frusto-conical shape and passes through a central opening in an annular metallic member e⁴ having a flange thereon adapted to engage the underside of the face d of the armoring similar to the flange e².

In Figs. 1 to 5, I have shown the studs as arranged in line centrally of the armoring, but if desired they can be staggered so as to cover a larger portion of the surface of the face d of the armoring. Such an arrangement of the studs is shown in Fig. 6 in which studs are employed of the type illustrated in Figs. 1 and 2, but round studs like those of Figs. 4 and 5 may be employed in a similar manner.

In the form of tire illustrated, the armoring D does not move relatively to the rim and spokes of the wheel, resiliency being afforded by the movement of the anti-skidding projections radially inward. Such movement of the projections is cushioned by the inflated tube and as soon as the pressure on the projections is lessened or removed they are pressed outwardly again to their normal positions as shown in the drawing. When a vehicle equipped with such tires is on a perfectly level surface the projections are pressed out their full extent but any little unevenness which would throw a greater weight on certain of the projections causes them to be moved inwardly more or less, the maximum increase moving them inward until their ends are flush with the surface of the armoring.

Having described my invention what I claim as new and desire to secure by Letters Patent of the United States is as follows:

In a tire, the combination of a resilient tube, an armoring therefor consisting of sheet-metal of U-shape cross-section partially inclosing the tube and so formed as to provide spaces between the tube and armoring into which the tube may fill when depressed, said armoring having openings in the face thereof, and projections supported on the tube and extending through the openings in the armoring, said projections being provided with means for preventing them from passing through said openings, substantially as set forth.

This specification signed and witnessed this 23d day of October, 1906.

EDWIN T. GREENFIELD.

Witnesses:
S. O. EDMONDS,
D. J. EDMONDS.